June 19, 1962   L. J. BISHOP   3,039,401
CONVEYOR TRACK STRUCTURE

Filed June 15, 1959   5 Sheets-Sheet 5

INVENTOR.
LEONARD J. BISHOP
BY Whittemore Hulbert
Belknap
ATTORNEYS

United States Patent Office 3,039,401
Patented June 19, 1962

1

3,039,401
CONVEYOR TRACK STRUCTURE
Leonard J. Bishop, Birmingham, Mich., assignor to Mechanical Handling Systems, Inc., Detroit, Mich., a corporation of Michigan
Filed June 15, 1959, Ser. No. 820,525
9 Claims. (Cl. 104—111)

The present invention relates to improvements in a track structure for an industrial overhead conveyor of the so-called power and free type, for example. As herein illustrated and described the improvements are applicable at any zone of the conveyor system, i.e., at a so-called free line, a power line, a straight or curved reach of either line, a rise or dip, etc.

It is an object of the invention to provide track structure of this type which, while its components are fabricated of relatively light weight metal stampings and roll-formed or otherwise formed sections, is extremely strong and rigid, and amply rugged to support heavy trolley loads and withstand vibratory and shock stresses to which it is continually subject.

A further object is to provide track provisions as described in which the components enable the track structure to be, in effect, custom-installed on location. This is made possible by reason of their ability to be assembled on the spot in many different relationships such as are bound to be required due to existing space and like considerations. This in turn signifies that the parts need not be cut, bent, punched, pre-assembled, etc., at the factory, then shipped at high cost to the place of installation. It also means that the components requiring painting may be factory painted, eliminating the need for the comparatively more expensive and time consuming paint job on location.

Another object is to provide a track improvement in which the connections of the various parts of the structure are bolted ones, in particular certain track and spine members in standard lengths spliced together without welding, with an absolute minimum of other welds in places which do not detract from the advantages of the construction in the respects mentioned above.

A further object is to provide a track structure as described in which there are improved provisions to laterally back up a conveyor chain, as in rounding a curve of a power line or track.

Another specific object is to provide a track structure incorporating a mono-rail type trackway for an overhead power line, as well as such hold-down means as are required to restrain trolleys vertically at rises or dips of the track.

More specifically, and in accordance with another object, the invention contemplates the use of roll-formed components of an improved, generally C-shaped cross section for the conveyor trolley tracks, as well as for certain stiffening spine and clamping parts. This makes for ease and speed in bolting them together on location in any desired relation. The open section design facilitates placement of bolts or studs and requires no special drilling or the like in installing.

In further accordance with the invention, the tracks, trolley hold-down or restraining provisions, and the like are overhead suspended by an improved arrangement of yoke-like hangers of inverted U-outline which, like other

2 components, are standardized for custom installation in the way described. These may also be roll-formed or sectioned in relatively light weight but ample strength and rigidity for the purpose. The invention also affords novel and improved ways to suspend and brace these hangers from above, as well as to bolt to the hangers the parts supported thereby.

The foregoing as well as other objects will become more apparent as this description proceeds, especially when considered in connection with the accompanying drawings illustrating the invention, wherein.

Figures 1, 2, 3:
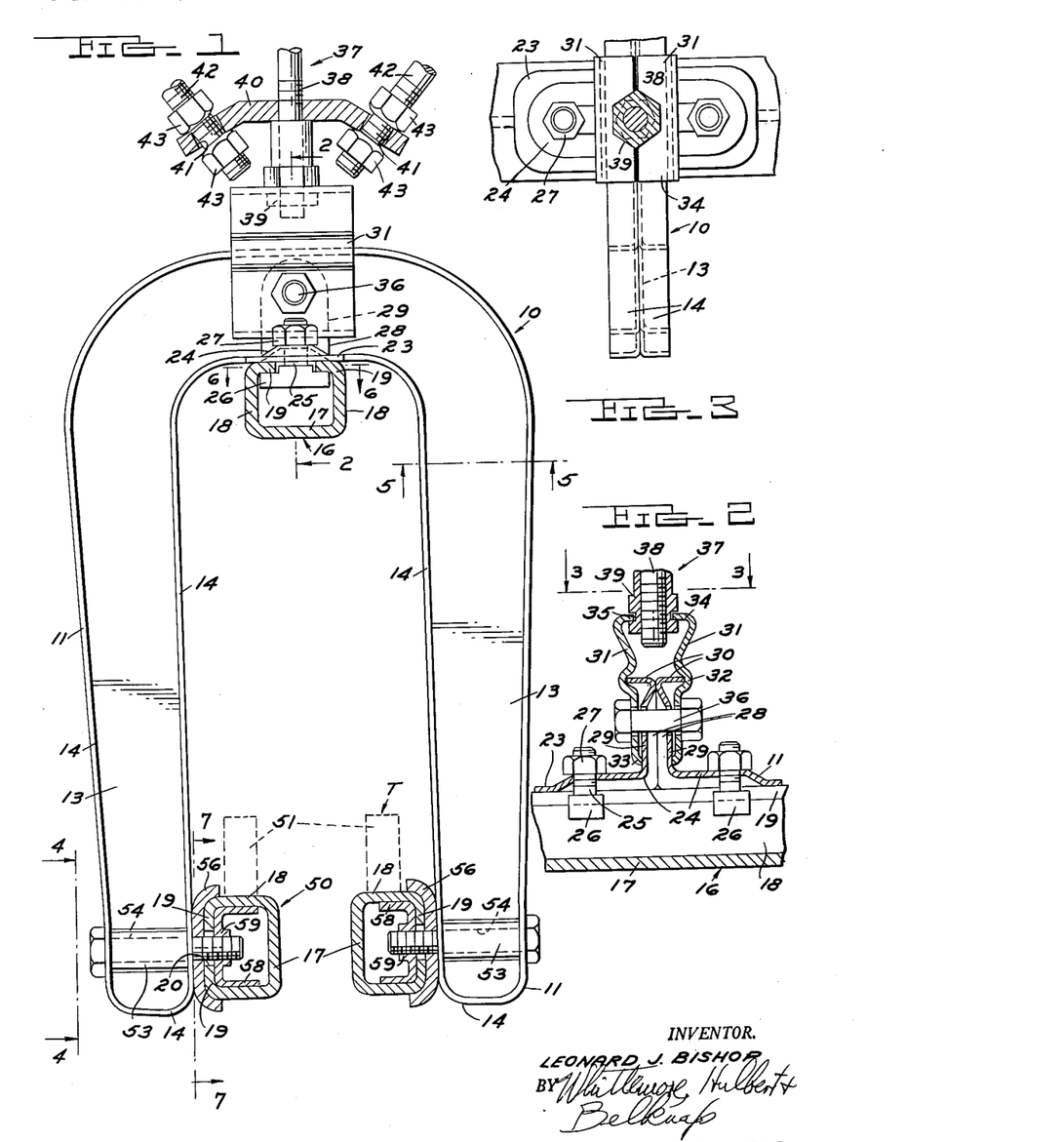
FIG. 1 is a fragmentary view in end elevation of an overhead support and hanger for the track structure of the invention, certain track and stiffening spine means associated with the hanger being shown in transverse vertical section.
FIG. 2 is a fragmentary view in vertical section on line 2—2 of FIG. 1.
FIG. 3 is a fragmentary view in horizontal section on line 3—3 of FIG. 2.
Figures 4, 5, 6, 8, 9:
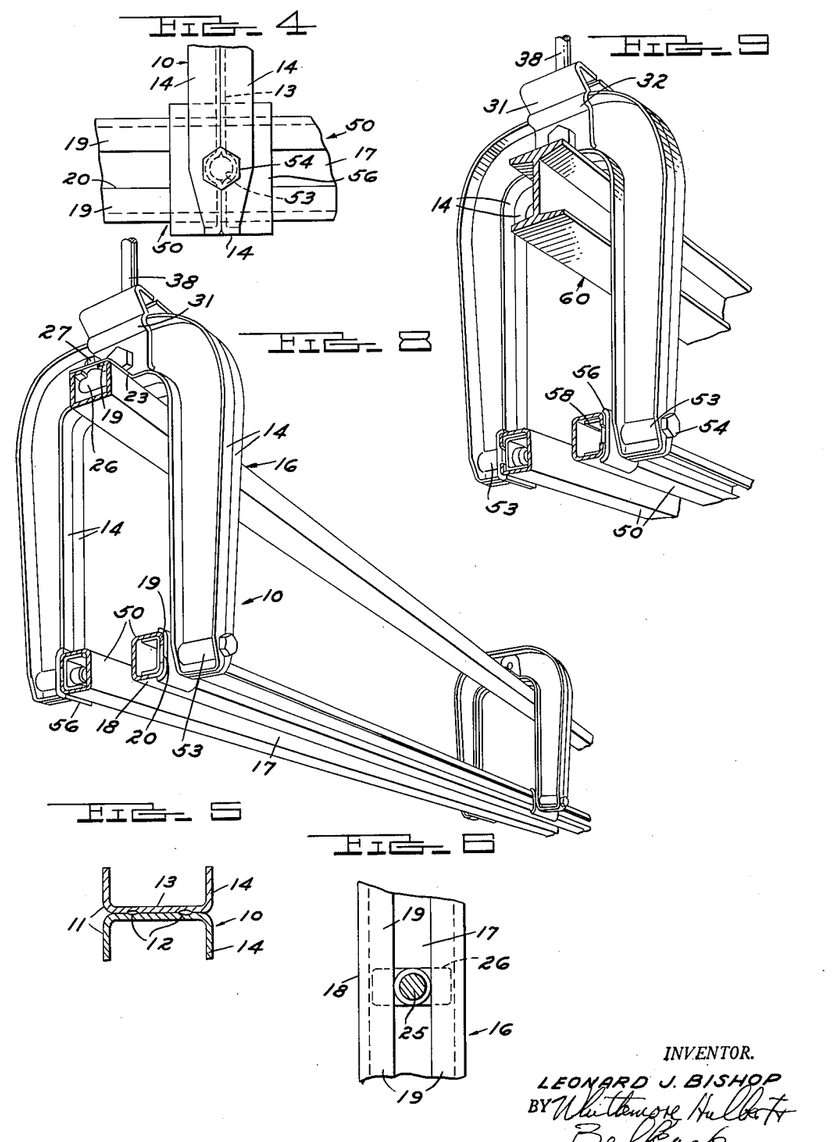
FIGS. 4–7, inclusive, are views in section on lines corresponding to lines 4—4, 5—5, 6—6 and 7—7, respectively, of FIG. 1, it being understood that the location of the structure of FIG. 7 will be at a track splicing zone longitudinally spaced from the zone of FIG. 4.
FIG. 8 is a fragmentary perspective view showing an installation of the track structure of the invention, in accordance with one embodiment, for a free line of a conveyor system.
FIG. 9 is a similar view of an installation as modified for use in a conveyor power line to support chain driven trolleys of such line.

As basically illustrated in FIG. 1 of the drawings, which happens to represent a section at a free, branch or transfer line of a conveyor system, but may as well be considered as being at a power line, in so far as features of track and track hanger structure are concerned, the reference numeral 10 generally designates one of a series of rigid hangers or yokes comprising the track structure of the invention. These members are of inverted U-shaped outline, being preferably fabricated (as illustrated in FIG. 5) of a pair of like stampings 11 of open C-shaped or channeled cross section, spot welded together at 12 at spaced points along the length of their respective central web portions 13. The flanges 14 of these sections are in aligned, flush relation at the opposed parallel side surfaces of the hanger 10, and the flanges are preferably brought continuously around the lower ends of the arms of the hanger, as shown in FIG. 1, thereby affording a smooth finished appearance, as well as increased stiffness. As mentioned above, the hangers 10, as well as any other parts requiring it, may be factory-painted, eliminating this factor of cost in the assembly on the job.

FIG. 8 of the drawings shows a plurality of such hangers 10 in a longitudinally spaced, braced series to support track provisions, to be described.

An elongated stiffening spine 16 is provided along the inner or lower surface of the inverted U outline of the series of hangers 10, this spine considerably rigidifying the assembly and, as will be described, also serving as a part of the means for suspending the hangers from above. The spine 16, as shown in FIGS. 1–8, is preferably roll-formed in a C-shaped section, including a horizontal web 17 and flanges 18 at 90° thereto; and the flanges 18 are in turn inturned 90° at 19, defining opposite sides of an elongated central slot 20 extending the length of the stiffening spine 16, for a purpose to be described.

In one embodiment thereof appearing in FIGS. 1–13, which is preferred over other embodiments as to certain structural details, the suspending arrangement for the hangers 10 makes use of similar integral suspending bracket formations 23 which are stamped at the top of the respective hanger members 11. Thus, each of the hanger sections 11 is provided, in the zone of the hanger across its top inverted bight portion, with an integral, laterally outwardly projecting foot formation or extension 23 of each of its inner, aligned flanges, which formations extend considerably further in the direction of the spine 16 than the remainder of the respective flanges 14. The suspending extensions or feet 23 are embossed upwardly to provide stiffening ribs 24, and special studs 25 extend through holes punched in ribs 12 to connect the feet 23 and hanger 10 to the spine 16. Thus, as shown in FIGS. 1, 2, 3 and 6, the studs 25 are provided with enlarged heads 26, which are arranged to underlie the inturned ends 19 of the section of spine 16, with the shanks of the bolts extending upwardly through the slot 20 of the spine, and with fastening nuts 27 applied to the studs to rigidly secure spine 16 to the suspending formations 23.

As best shown in FIG. 2 of the drawings, the hanger sections 11 are also stamped to provide upwardly projecting, integral, tongue-like suspending formations 28, which inwardly abut one another, each of these formations being embossed at 29 to provide a stiffening rib. The ribs 29 converge into meeting engagement at upper, outwardly flanged shoulder portions 30 of the sections 11.

A pair of like suspending clips 31 are provided, in the form of plate-like stampings shaped to provide grooved portions 32 receiving and clamping the respective flanged shoulders 30, inturned lower toe portions 33 similarly clamping the suspending formations 28, and upper inturned portions 34 which are in edge engagement with one another, other than at the central zone of the suspending clips 31. In this zone they are notched at 35.

The clips 31 are drawn tightly together by means of a stud 36 extending through aligned apertures in the pairs of clips and suspending formations 28, thus to clamp the hanger sections 11 tightly.

An adjustable suspending device 37 then hangs the assembled hanger 10, spine 16 and the clamped clips 31 from a suitable overhead support, at appropriately spaced points longitudinal of the spine. In a preferred adaptation, and as shown in FIGS. 1 and 2, the device 37 comprises an overhead-supported vertical rod 38 having its lower end threaded to adjustably receive a sleeve or collar 39. Collar 39 is annularly grooved to be rotatively received in the aperture between clips 31 constituted by their mutually facing notches 35. Thus a simple adjustment of the collar (which has a hex formation for the purpose) enables any desired vertical adjustment of the position of the hanger 10 and track structure along longitudinally spaced points thereof.

The invention also contemplates provisions such as are shown in FIG. 1 for the lateral bracing of the track installation. To this end thrust plates 40 of mildly angular cross section and appropriate thickness are sleeved onto the respective suspending rods 38 and are apertured at 41 (at either or both of the lateral projecting ends thereof) to receive one or more bracing thrust rods 42, which are axially sustained fixedly from above. The lower end of the rod 42 is threaded for the reception of stop and lock nuts 43 on either side of the thrust plate 40, so that the rods may be adjustably taken up to brace the hanger structure rigidly.

Referring to FIGS. 1, 4, 8 and 9 of the drawings, the hangers 10 as braced by a spine, whether of the hollow sort described above (also shown in FIG. 14), or as will be described in connection with the modification of FIG. 9, serve adjacent the lower ends thereof as supports for a pair of track lengths, generally designated 50, which extend in parallel laterally spaced relation to one another, and on which ride the load rollers 51 of a load supporting trolley T of well known type, such as appear in FIGS. 11 and 13, for example.

The tracks 50 are each fabricated of a generally C-shaped channel section similar to the stiffening spine 16. Accordingly, the characteristic web, 90° flanges and inturned ends of this track length section are designated by corresponding reference numerals. Referring to FIGS. 1 and 4, the web portions 13 of the weld-connected, back-to-back sections 11 are formed, at the elevation of the respective tracks 50, to provide therebetween a pair of opposed arcuate seats 53, with spot welding omitted in this zone. The seats receive horizontal bolts or studs 54, these studs extending through apertured anchoring seats 56 disposed between the inner hanger flanges 14 and the adjacent slotted face of the respective track lengths 50. Such face is constituted by the inturned flange ends 19. The seat 56 is inwardly concave to nestingly engage the track and assist in sustaining the same vertically. It curves about the adjacent top and bottom corners of the track 50 to brace the latter rigidly and resist possible spreading tendency of the flange ends 19, as well as giving a positive grip on the track to maintain the latter absolutely rigid in the vertical sense relative to the hanger 10. The seat 56 is supported directly on the stud 54, as shown in FIG. 1.

Inner clamping clips or spines 58 of C-shaped vertical cross section are fitted into each of the tracks 50 at each of the hangers 10, a manipulation which is facilitated by the access to these spines at the horizontal slot 20 of the track. The bolts or studs 54 are threadedly engaged in apertured formations 59 of the clips 58, and if desired, additional nut fasteners may be employed. Thus the tracks 50 are rigidly tied to the yokes or brackets 10 and themselves serve to rigidify the structure as a whole, all without recourse to welds in making the installation on location. Clips 58 brace the track against transverse distortion in compression, just as the seats 56 prevent transverse spreading of the flanges 19; and the clips 58 coact with seats 56 to complete the mount of track 50 on the hanger 10, without any possibility of its vertical movement on the hanger leg, and despite the relative wideness of the slot 20 between the flanges 19 of the track 50.

Referring now to FIG. 9, there is shown therein a typical alternative type of installation, identical in all respects to that shown in FIGS 1, 2 and 8, save for the fact that the spine which braces the suspending hangers 10, generally designated 60, is in the form of an I-beam of substantial size, preferably welded at its top flange to and beneath the bottom, flush flanges 14 of the hanger 10. Other features of the construction are as illustrated and described above; and accordingly, corresponding reference numerals are employed to designate the same.

Figure 7:
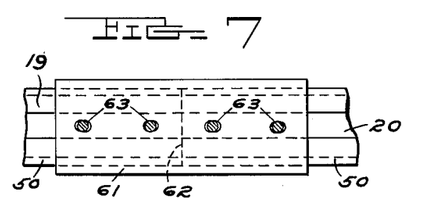

FIG. 7 of the drawings illustrates improved and simplified provisions in accordance with the invention for splicing together, in end-to-end relation, successive lengths of track 50. To this end, short lengths 61 of stock in an inwardly concave cross sectional outline of the seat members 56 are employed, spanning the end joint 62 of the track lengths 50 and being bolted to the latter on opposite sides of the joint, as by bolts or studs 63, preferably also employing clips 58 of the character shown in FIG. 1.

It is thus possible to provide a strong and rigid bracing tie-up of the succeeding track sections, without welding and in a very small available space. It is to be understood that the splices 61 will be applied between successive hanger brackets 10 in any installation.

Figure 10:
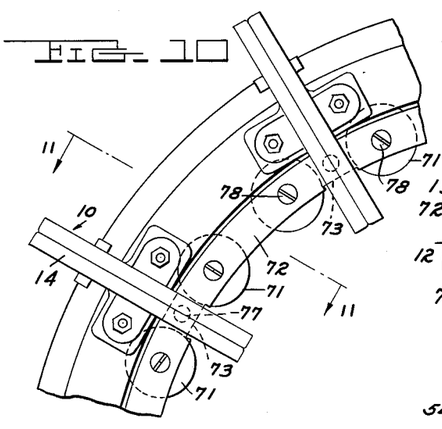
FIG. 10 is a fragmentary top plan view of an improvement of the invention in regard to the track structure as applied to the so-called power or chain conveyor line of a system at a cornering zone.
Figure 11:
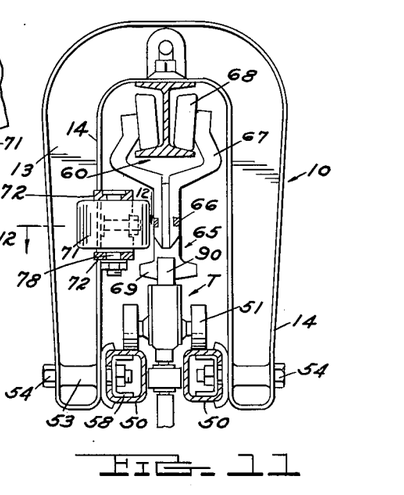
FIG. 11 is a view in vertical section on line 11—11 of FIG. 10.
Figure 12:
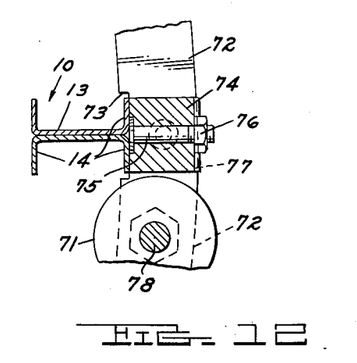
FIG. 12 is an enlarged fragmentary view in horizontal section on line 12—12 of FIG. 11.

FIGS. 10, 11 and 12 illustrate provisions in accordance with the invention, for special application in rounded reaches or turns of an installation, for guiding and sustaining the overhead power conveyor in rounding these turns. It is to be understood that, although the invention as described to this point is illustrated as applied to a so-called free line, i.e., lacking power chain or conveyor means for positively advancing the trolleys T, which usually travel the line gravitationally due to a slight inclination thereof, that the track structure as described is equally applicable and is actually employed in full in the power line portions of any installation.

As illustrated in FIG. 11, the power conveyor, generally designated 65, comprises an endless chain including links 66, and the chain is driven in conventional fashion not necessary to illustrate or describe in detail, by a Caterpillar engagement of a power device (not shown) with certain axially spaced links interconnected with the links 66. Conveyor 65 further includes yoke members 67 equipped with rollers 68 which ride the lower flanges of an I-beam spine 69, this spine thus serving as a track for the power conveyor 65. The latter is equipped with depending drive dogs 69, which conventionally engage a dog or lug 70 on a trolley T to advance the same along the tracks 50.

In a corner rounding zone of such a track structure (FIG. 10) the tracks 50, 60 are, of course, of the desired arc, and the innermost track is equipped, at the vertical elevation of the chain links 66, with a series of backup rollers 71 journalled on vertical axes. A pair of upper and lower, correspondingly curved lengths 72 of strap metal serve as vertically spaced supports for the rollers, each of these supports being notched at 73 at the successive hangers 10, in which notches the respective flush flanges 14 of the hangers are received. The roller supporting and journalling straps 72 are spaced from one another by suitable spacer blocks 74 (FIG. 12) in the zone of the notches 73. The blocks 74 are rigidly secured on the respective hangers by weld bolts or studs 75 welded to the adjacent surface of the hanger flanges 14, these studs extending through the blocks 74 and having nuts 76 threaded thereon to clamp the spacer blocks.

The support straps 72 are in turn secured, respectively, to the top and bottom of the successive blocks 74, as by bolts or screws 77; and the backup rollers 71 are disposed in spaced relation between the successive hangers 10, with their rollers or trunnions 78 suitably received in the upper and lower straps, thus to individually journal the rollers, about which the chain 66 bears inwardly in rounding the corner.

This construction of the corner turn results in a rigid, self-contained structure when assembled to the adjoining straight sections of the track structure, being able to withstand the reaction forces applied by the driving chain to the backup rollers 71. The design eliminates the usual separate frame for such backup rollers, which normally is positioned above the power line track and has to have its own suspension supports and bracing.

In power line reaches of any installation in which there are vertical dips or rises, it is desirable in certain installations to provide means to vertically restrain the trolleys, as by engagement with their track rollers 51, thus to prevent undesired vertical tilt of the trolleys in traversing the rise or dip, with resultant disengagement from the tracks 50.

Figure 13:
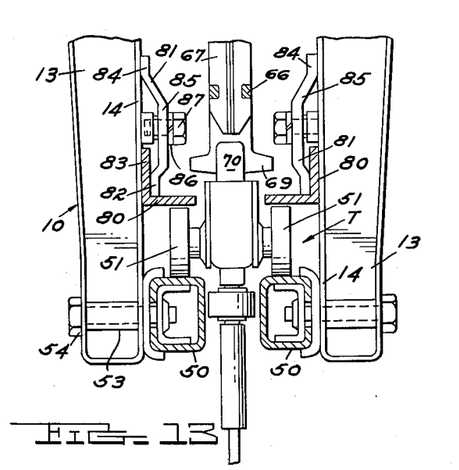
FIG. 13 is a fragmentary view similar to FIG. 11 showing power line track structure according to the invention equipped with trolley hold-down means for a zone in which there may be a rise or dip in the intended line of travel.

To this end, the invention in its preferred form contemplates the provision of hold-down ways 80 of desired length, such as are shown in FIG. 13 of the drawings. These ways are, of course, arranged in parallelism with the tracks 50 at the dip or rise in question, and they are secured to hangers 10 by means of individually releasable clips 81. This enables the hold-down means to be installed or not, on location, as desired.

The clips 81 have a mildly angular cross sectional outline shown in FIG. 13, affording a lower clamping foot 82 to press against an upright outer flange 83 of the hold-down way, an upper foot 84 to similarly bear against the flanges 14 of the hanger, and an intermediate bridge portion 85 spaced inwardly from the feet 82, 84.

In order to mount the clips 81, the invention contemplates the use of a weld stud on the flanges 14, extending outwardly through the clip bridge portion 85 and having a lock washer 86 and nut 87 applied thereto. The clip is clamped to the hanger with ample force to hold the way 80 in place, and the latter may be quickly attached should circumstances require.

Figures 14, 16:
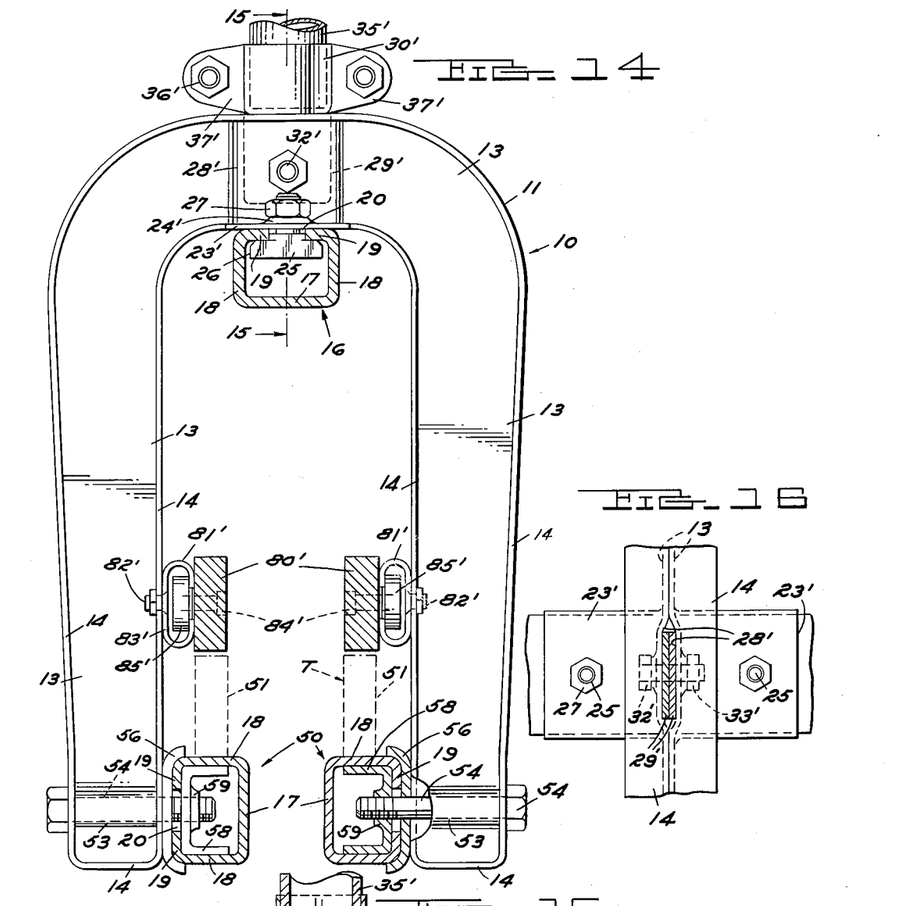
FIG. 14 is a view similar to FIG. 1 of a track structure in accordance with a modified adaptation of certain features of the invention.
FIG. 16 is a fragmentary view in horizontal section on line 16—16 of FIG. 15.
Figure 15:
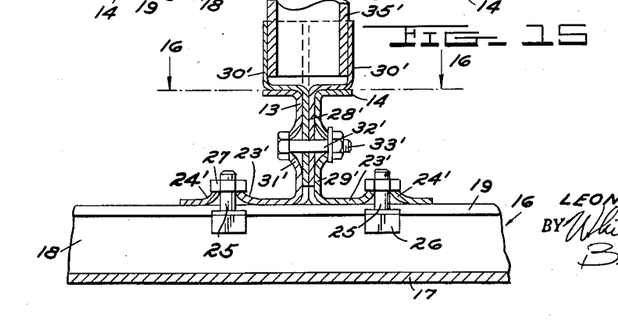
FIG. 15 is a fragmentary view in vertical section on line 15—15 of FIG. 14.

FIGS. 14–16 illustrate a modified embodiment of the track structure which is basically similar to what is shown in FIGS. 1–13, but differing therefrom as to some of its components. As to most features the arrangements are substantially the same, if not identical; accordingly, corresponding reference numerals are employed to designate corresponding parts and relationships, and further extended description thereof is omitted.

In this embodiment the provisions for suspending the hangers 10 differ from the preferred form previously described, in that each of the hanger sections 11 of yoke hangers 10 is provided with an integral, laterally outwardly projecting foot formation or extension 23', corresponding to the formation 23 of the first form, which is punched to provide upwardly cupped bolt receiving portions 24', and studs 25' are employed through portions 24' to connect the feet 23' to the spline 16 in the manner described above.

The web portions 13 of the hanger sections 11 are spaced somewhat from one another in the upper yoke zone of the hangers, as by indenting the webs laterally relative to one another in the manner shown in FIG. 16 to provide a clamp recess 28' in each. This recess receives the depending flat tongue extensions 29' of a pair of like, upwardly opening socket elements 30' integral with the tongues 29', each socket element being of approximately semi-circular cross section in a horizontal plane. The web portions 13 are punched correspondingly to the feet 23' to provide bolt or stud receiving formations 31'; and bolts 32' extend through these formations, as well as through apertures in the flat tongue elements 29', receiving nuts 33' to clamp the tongue portions rigidly between the top, transversely extending web portions 13 of the sections 11 of each hanger 10.

The reference numeral 35' in FIGS. 14 and 15 designates a rigid tubular suspending rod, of which there are a number suitably supported from above in an installation of the present track structure. In making the assembly of the latter, these rods are nested between the clamped, semi-cylindrical socket members 30', whereupon clamp bolts 36' are applied to pairs of laterally oppositely extending clamp ears 37' integral with the socket elements 30' to rigidly clamp the hangers 10 in suspended engagement with the overhead-supported tubular rods.

As has been indicated above, the spine 16 may be further and otherwise suspended from above.

Figure 17:
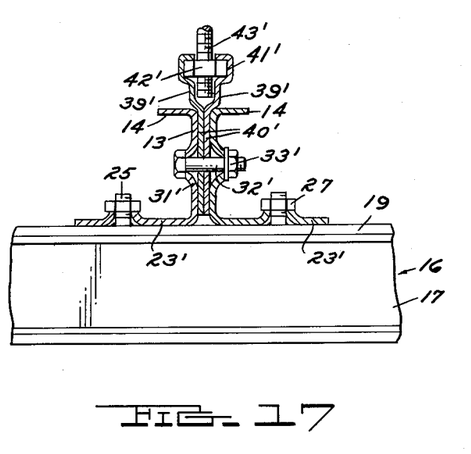
FIG. 17 is a fragmentary view in section similar to FIG. 15 showing an alternative form of hanger suspending arrangement.

A further modified adaptation of the suspending provisions is illustrated in FIG. 17 of the drawings. Here the suspending foot extensions 23' of the hanger sections, at the top inverted yoke zone of the hangers 10, are clamped to the spine 16 by bolts or studs 25' in the manner previously described, and their webs 13' are similarly employed to bolt the same to a suspending device. However, as illustrated in FIG. 17 the suspending device comprises a pair of rigid socket elements 39' of a different character. That is, they include integral flat tongue elements 40' locked between the hanger webs 13 by the bolts or stud 32', but their upper portions are of smaller size and are differently formed to provide coacting pocket elements 41'. These pocket elements receive therebetween a nut 42' which is adjustably engaged by a threaded overhead stud 43', enabling a desired vertical adjustment of the support for the hanger 10. When the proper adjustment is made, the nuts 33' are taken up tightly.

Figure 18:
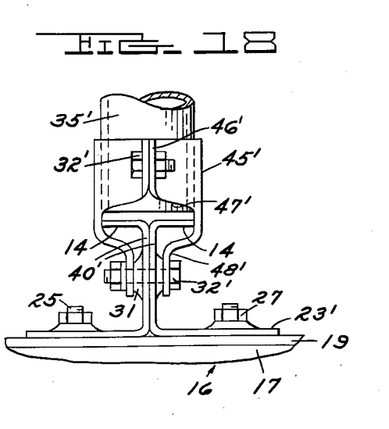
FIG. 18 is an end elevational view of still another modification of the hanger suspension.

FIG. 18 of the drawings illustrates a still further modified adaptation of the suspending bracket provisions. In this form, a pair of coacting socket elements 45' are provided, being of generally cylindrical cross section and laterally flanged at 46' to receive the takeup bolts 32' as in the embodiment of FIGS. 15, 16 and 17. However, in this case, the lower ends of the socket elements 45' are disposed to encircle out-turned flanges 14 of the hanger sections. In this zone, the sockets are cut away at 47' to provide rigid clamp arms 48', which arms are bent inwardly toward one another for engagement with opposite ends of the bolt receiving formations 31'. With the parts so assembled, the bolts 32' are taken up, as well as the clamp bolts 36', thus rigidly connecting the hanger suspending provisions of the overhead-supported tubular rod or column 35'.

Referring again to FIG. 14 of the drawings, there is shown a modified type of hold-down rail 80' to prevent undesired tilting or upward lift of the trolley rollers 51 in riding the tracks 50.

In this adaptation the rails 80' are of solid rectangular cross section, and in order to mount the same the invention contemplates the use of the C-shaped type of fastener clip or device 81' shown. A pair of machine screws 82' are employed to secure the outer web portions 83' of each clip 81' to the hanger 10, these screws engaging in the inner flanges 14 of the hanger at either side of their welded webs 13. A further machine screw 84' is employed to clamp the rail to the clip 81', this screw threadedly taking into a round clamp head 85' of enlarged size within the clip. As before, convenience and ease in the assembly of the rails to the hanger is facilitated by the open, C-shaped configuration of the clips 81'.

It is seen from the above, that the structural characteristics of the various components of the structure, i.e., the standardized brackets, the stiffening spines, the tracks and associated clamping clip or spine and fastening means, the hold-down means, the cornering provisions, etc., all have the effect of enabling a custom type of assembly of standard components on location, rather than requiring a special job of factory bending, punching, stamping and the like. Any and all of the components may be quickly and easily assembled together in any of various relationships called for by the particular needs of the installation. The parts are simple and inexpensive, though amply rugged and rigid for the heavy duty work they perform.

As appears above, a track structure constituted as described may also furnish support for an overhead power conveyor track or beam of the well known monorail type, as well as at a free line track. It is also evident that the construction of the invention is well adapted to serve as a support for various switching and other trolley control units commonly employed in installations of this sort.

It is to be understood that the foregoing description and the drawings disclose a preferred embodiment of the invention, and that various modifications in regard to features of the yokes, track supports, tracks and the like are contemplated as falling within the scope of the appended claims.

What I claim as my invention is:

1. Track structure for a conveyor system, comprising a plurality of longitudinally spaced, upright supports of U-shaped outline providing laterally spaced leg portions integrally connected by a cross portion, each of said supports comprising a pair of similar members each including a pair of spaced, outwardly projecting flanges and a web extending between and integrally connecting said flanges with one another, said members being fixedly secured together with said webs in back-to-back engagement and the respective flanges substantially flush and extending in opposite directions, said members being provided at each leg portion with a recess in the web thereof extending across its width and through the respective flanges thereof to provide a transverse opening through the hanger leg portion, elongated parallel track members engaging the inner pair of flanges of the respective leg portions, and securing members extending through said transverse openings and engaging said track members to connect the track members to said leg portions.

2. Track structure for a conveyor system, comprising a plurality of longitudinally spaced, upright hangers of inverted U-shaped outline providing laterally spaced leg portions integrally connected by a cross portion, each of said hangers comprising a pair of similar stampings each including a pair of spaced, outwardly projecting flanges and a web extending between and integrally connecting said flanges with one another, said stampings being fixedly secured together with said webs in back-to-back engagement and the respective flanges substantially flush and extending in opposite directions, at least one of said stampings being provided at each leg portion with a recess in the web thereof extending across its width and through the respective flanges thereof to provide a transverse opening through the hanger leg portion, elongated parallel track members engaging the inner pair of flanges of the respective leg portions, and securing members extending through said transverse openings and engaging said track members to connect the track members to said leg portions.

3. Track structure for a conveyor system, comprising a plurality of longitudinally spaced, upright hangers of inverted U-shaped outline providing laterally spaced leg portions integrally connected by a cross portion, each of said hangers comprising a pair of similar stampings each including a pair of spaced, outwardly projecting flanges and a web extending between and integrally connecting said flanges with one another, said stampings being fixedly secured together with said webs in back-to-back engagement and the respective flanges substantially flush and extending in opposite directions, said stampings being provided at each leg portion with a recess in the web thereof extending across its width and through the respective flanges thereof to provide a transverse opening through the hanger leg portion, elongated parallel track members engaging the inner pair of flanges of the respective leg portions, and securing members extending through said transverse openings and engaging said track members to connect the track members to said leg portions.

4. Track structure for a conveyor system, comprising a plurality of longitudinally spaced, upright hangers of inverted U-shaped outline providing laterally spaced leg portions integrally connected by a cross portion, each of said hangers comprising a pair of similar stampings each including a pair of spaced, outwardly projecting flanges and a web extending between and integrally connecting said flanges with one another, said stampings being fixedly secured together with said webs in back-to-back engagement and the respective flanges substantially flush and extending in opposite directions, at least one of said stampings being provided at each leg portion with a recess in the web thereof extending across its width and through the respective flanges thereof to provide a transverse opening through the hanger leg portion, elongated parallel track members engaging the inner pair of flanges of the respective leg portions, said track members being of generally C-shaped cross section, having inturned edges facing one another and defining an elongated opening therebetween, said elongated openings facing said respective inner hanger flanges, and securing members extending through said transverse openings and engaging said track members at said elongated openings thereof to connect the track members to said leg portions.

5. Track structure for a conveyor system, comprising a plurality of longitudinally spaced, upright hangers of inverted U-shaped outline providing laterally spaced leg portions integrally connected by a cross portion, each of said hangers comprising a pair of similar stampings each including a pair of spaced, outwardly projecting flanges and a web extending between and integrally connecting said flanges with one another, said stampings being fixedly secured together with said webs in back-to-back engagement and the respective flanges substantially flush and extending in opposite directions, at least one of said stampings being provided at each leg portion with a recess in the web thereof extending across its width and through the respective flanges thereof to provide a transverse opening through the hanger leg portion, elongated parallel track members engaging the inner pair of flanges of the respective leg portions, said track members being of generally C-shaped cross section, having inturned edges facing one another and defining an elongated opening therebetween, said elongated openings facing said respective inner hanger flanges, and means securing each of said track members to one of the respective leg portions, comprising a securing member extending through said transverse opening of the leg portion and the elongated opening of the track member, an element interposed between said track member and leg portion through which the said securing member extends, said element embracing adjacent upper and lower corner zones of the track member to brace the latter in the vertical sense, and an internal element within said track member in threaded engagement with said securing member to clamp said track member and first named element against the hanger leg portion.

6. Track structure for a conveyor system, comprising a plurality of longitudinally spaced, upright hangers of inverted U-shaped outline providing laterally spaced leg portions integrally connected by a cross portion, each of said hangers comprising a pair of similar stampings each including a pair of spaced, outwardly projecting flanges and a web extending between and integrally connecting said flanges with one another, said stampings being fixedly secured together with said webs in back-to-back engagement and the respective flanges substantially flush and extending in opposite directions, at least one of said stampings being provided at each leg portion with a recess in the web thereof extending across its width and through the respective flanges thereof to provide a transverse opening through the hanger leg portion, elongated parallel track members engaging the inner pair of flanges of the respective leg portions, said track members being of generally C-shaped cross section, having inturned edges facing one another and defining an elongated opening therebetween, said elongated openings facing said respective inner hanger flanges, and means securing each of said track members to one of the respective leg portions, comprising a securing member extending through said transverse opening of the leg portion and the elongated opening of the track member, an element interposed between said track member and leg portion through which the said securing member extends, said element embracing adjacent upper and lower corner zones of the track member to brace the latter in the vertical sense, and an internal element within said track member in threaded engagement with said securing member to clamp said track member and first named element against the hanger leg portion, said internal element having vertical bracing engagement with the interior of said track member to resist compressive distortion of the latter.

7. Track structure for a conveyor system, comprising a plurality of longitudinally spaced, upright hangers of inverted U-shaped outline providing laterally spaced leg portions integrally connected by a cross portion, each of said hangers comprising a pair of similar stampings each including a pair of spaced, outwardly projecting flanges and a web extending between and integrally connecting said flanges with one another, said stampings being fixedly secured together with said webs in back-to-back engagement and the respective flanges substantially flush and extending in opposite directions, at least one of said stampings being provided at each leg portion with a recess in the web thereof extending across its width and through the respective flanges thereof to provide a transverse opening through the hanger leg portion, elongated parallel track members engaging the inner pair of flanges of the respective leg portions, said track members being of generally C-shaped cross section, having inturned edges facing one another and defining an elongated opening therebetween, said elongated openings facing said respective inner hanger flanges, securing members extending through said transverse openings and engaging said track members at said elongated openings thereof to connect the track members to said leg portions, and a longitudinally extending spine member of generally C-shaped cross section corresponding to that of the track members, being provided with a similar elongated opening, said spine member being disposed at 90° to and engaging the respective cross portions of said hangers, the spine member being provided with a securing member rigidly connecting the same to the hanger cross portion through the elongated opening of the spine member.

8. In track structure for a conveyor system, track supporting means comprising an upright support of U-shaped outline providing laterally spaced leg portions integrally connected by a cross portion, said support comprising a pair of similar members each including a pair of spaced, outwardly projecting flanges and a web extending between and integrally connecting said flanges with one another, said members being fixedly secured together with said webs in back-to-back engagement and the respective flanges substantially flush and extending in opposite directions, at least one of said members being provided at each leg portion with a recess in the web thereof extending across its width and through the respective flanges thereof to provide a transverse opening for the reception of a track securing member.

9. In track structure for a conveyor system, track supporting means comprising an upright hanger of inverted U-shaped outline providing laterally spaced leg portions integrally connected by a cross portion, said hanger comprising a pair of similar stampings each including a pair of spaced outwardly projecting flanges and a web extending between and integrally connecting said flanges with one another, said stampings being fixedly secured together with said webs in back-to-back engagement and the respective flanges substantially flush and extending in opposite directions, said stampings each being provided at each leg portion with a recess in the web thereof extending across its width and through the respective flanges thereof to provide a transverse opening for the reception of a track securing member.

References Cited in the file of this patent

UNITED STATES PATENTS 1,174,540   Bean ------------------ Mar. 7, 1916

(Other references on following page)

UNITED STATES PATENTS

| | | |
|---|---|---|
| 1,876,904 | Francis | Sept. 13, 1932 |
| 2,076,106 | Wehr | Apr. 6, 1937 |
| 2,156,827 | Wehr | May. 2, 1939 |
| 2,187,498 | Landahl | Jan. 16, 1940 |
| 2,335,833 | Wood | Nov. 30, 1943 |
| 2,336,551 | Kumler | Dec. 14, 1943 |
| 2,345,650 | Attwood | Apr. 4, 1944 |
| 2,612,847 | Burrows | Oct. 7, 1952 |
| 2,767,951 | Cousino | Oct. 23, 1956 |
| 2,784,812 | Kindorf | Mar. 12, 1957 |

FOREIGN PATENTS

| | | |
|---|---|---|
| 1,026,347 | Germany | Mar. 20, 1958 |

OTHER REFERENCES

"Overhead Chain Conveying" by King of "King Conveyors" Publication O.C. 48 (20 pages). (Copy of this publication is on record in Div. 34 of U. S. Patent Office under class 104 subclass 172. Received in Division 34 on October 2, 1957.) Entire publication relied on.